July 18, 1967    F. W. MOORE    3,331,384
AUTOMATIC SEQUENTIAL VALVE
Filed June 29, 1964
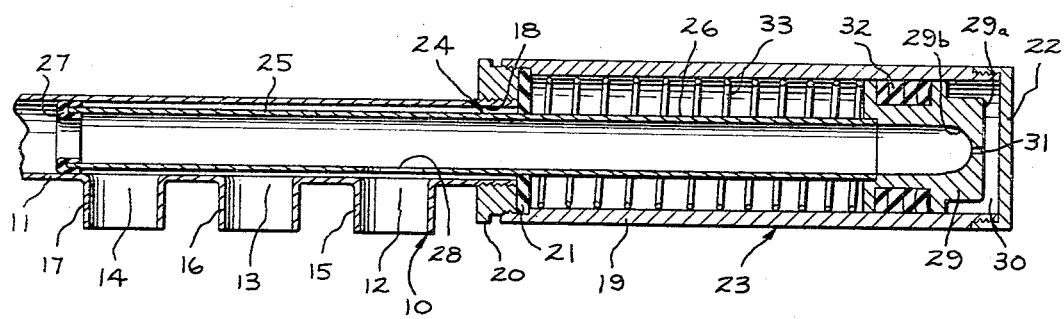
INVENTOR.
FRED W. MOORE
BY *James E. Espe*
HIS ATTORNEY though it is to be understood that I intend to cover all such modifications and changes as fall within the true spirit and scope of my invention.

United States Patent Office
3,331,384
Patented July 18, 1967

3,331,384
AUTOMATIC SEQUENTIAL VALVE
Fred W. Moore, Louisville, Ky., assignor to General Electric Company, a corporation of New York
Filed June 29, 1964, Ser. No. 378,874
1 Claim. (Cl. 137—119)

This invention relates to fluid valves and, more particularly, to an improved valve for causing a stream of fluid flow through a number of conduits in sequence.

It is often desirable to cause a stream of fluid flowing in one conduit to be sequentially directed into one of a number of other conduits. Many prior art devices for performing this diverting function include expensive electromagnetic valve elements for opening the conduits to the stream of fluid. Such constructions are expensive to build and complicated in operation.

It is an object of this invention to provide a valve which is inexpensive to construct and simple in operation.

It is a further object of this invention to provide such a valve in which the fluid flowing through the valve provides the force for operating the valve.

It is another object of this invention to provide a valve of the type indicated wherein the valve is also a timing device to govern the length of time that fluid is directed out through the respective conduits.

Briefly stated, in accordance with one aspects of my invention, a valve is provided which includes an entry conduit having a number of axially spaced outlet openings. A hollow housing is mounted on the end of the conduit and a tube is mounted with one end extending into the conduit and the other end extending into the housing. The end of the tube received within the conduit is provided with a resilient sealing means, so that all the fluid flowing through the conduit enters the tube. An opening is provided in the side wall of the tube and is disposed to be sequentialy brought into registry with each of the outlet openings in the conduit so that fluid flowing through the conduit is directed sequentially through the outlet openings. The end of the tube received in the housing cooperates with a piston for axial movement within the housing. The piston and the housing form a fluid-receiving chamber and the piston includes an opening connecting the interior of the tube with the chamber so that a portion of the fluid flowing through the conduit will enter the chamber and move the piston and tube to cause the opening in the tube to be brought into registry with each of the outlet openings in the conduit in sequence. A spring may be associated with the tube and the piston to return the tube and piston to their original positions upon discontinuance of the fluid flow in the conduit.

The subject matter which I regard as my invention is specifically pointed out and distinctly claimed in the concluding portion of this specification. My invention, however, together with further objects and advantages thereof may best be understood by reference to the following description taken in conjunction with the attached drawing.

The single figure of the drawing shows a plan view of a valve incorporating my invention, partly broken away and partly in cross-section for purposes of illustration.

Referring now to the drawing, there is shown a valve 10 including an elongated entry conduit 11. The entry conduit is provided with axially disposed outlet openings 12, 13 and 14 having nipples 15, 16 and 17, respectively, surrounding the outlet openings so that other conduits may be attached to the entry conduit in registry with the outlet openings.

The end 18 of entry conduit 11 near the outlet openings is attached to a cylinder 19 by means of a nut 20 which is mounted around the conduit 11 and threadedly engaged in the cylinder 19. A first resilient sealing means, such as a gasket or washer 21 is provided between the nut 20 and cylinder 19 to insure that the joint is substantially fluid tight. The other end of cylinder 19 is closed by means of a cap member 22 which is threadedly engaged on the cylinder, cylinder 19 and cap member 22 forming a fluid-tight housing 23.

A tube 24 is mounted with one portion 25 received in the conduit 11 and another portion 26 received in the housing 23. A second resilient sealing means, such as an annular seal 27 is mounted around the end of portion 25 and has a close sliding fit with the interior surface of conduit 11 so that the fluid flowing through conduit 11 will flow through tube 24. Portion 25 of tube 24 is provided with an opening 28 which is disposed to be brought sequentially into registry with outlet openings 12, 13 and 14 so that fluid flowing through conduit 11 and tube 24 is directed through the outlet openings. To insure that none of the fluid flowing out of tube 24 through opening 28 enters housing 23, the first resilient sealing means or gasket 21 is provided with a close sliding fit about the exterior surface of tube 24. If desired, sealing means may be provided around opening 28 to minimize leakage into the area between tube 24 and conduit 11.

The end of portion 26 cooperates with a piston 29 which is, in turn, slidingly received within the housing 23. The piston 29 and housing 23 form a chamber 30 and the piston is provided with an opening 31 connecting the chamber with the interior of the tube 24 so that a small portion of the fluid flowing into the tube 24 from conduit 11 will pass into chamber 30. A gasket structure 32 is mounted between piston 29 and the interior surface of cylinder 19 so that none of the fluid received in chamber 30 will pass between cylinder 19 and piston 29.

With the structure shown, as fluid flows through conduit 11, substantially all of the fluid will be directed outwardly through openings 28 and 12 and nipple 15 while only a small portion of it will flow through openings 31 into chamber 30 since the area of opening 31 is substantially less than the cross sectional area of tube 24. Since the surface 29a of piston 29 adjacent and facing chamber 30 is larger than the surface 29b of piston 29 in communication with and facing tube 24, as chamber 30 fills with fluid there will be a net effective force on piston 29 which forces the piston and tube 24 so that opening 28 moves out of registry with opening 12 and into registry with opening 13 so that most of the fluid flowing through conduit 11 then flows out through opening 13 and nipple 16. As the flow of fluid continues, more fluid is received in chamber 30 and continues to force the piston and tube to move opening 28 out of registry with opening 13 and into registry with opening 14 so that most of the fluid then flows outwardly through opening 14 and nipple 17. It should be noted that as tube 24 is moved by piston 29, opening 28 becomes partially restricted by the wall of conduit 11 between adjacent openings therein. Accordingly, piston 29 and tube 24 move more rapidly as opening 28 becomes more restricted since more fluid is being forced through opening 31.

It should be appreciated that varying the size of opening 31 will also vary the time that opening 28 remains in registry with any of openings 12, 13 or 14. This provides a timing function and to make the timing function adjustable, means such as an adjustable needle valve may be positioned in opening 31.

In order to return the tube 24 and piston 29 to their original position (as shown in the figure) a coil spring 33 is mounted within the housing 23 between the first resilient sealing means or gasket 21 and piston 29. As the fluid fills chamber 30 and moves the piston, it compresses the spring 33 and when the flow of fluid is discontinued the spring elongates to move the piston and tube to the position shown in the figure, forcing the fluid in chamber 30 back through opening 31 into tube 24.

It will be seen that, with the construction shown, I have provided a valve which may be easily constructed from a minimum number of inexpensive parts and is simple in operation. I provide a valve structure in which the fluid flowing through the valve provides the force for operating the valve to cause the fluid to be directed through a number of outlet openings in sequence and to store energy for returning the valve to its original position at the conclusion of the fluid flow.

While I have shown and described a particular embodiment of my invention, I do not desire the invention to be limited to the precise construction described, and I intend by the appended claim to cover all modifications which fall within the true spirit and scope of my invention.

What I claim as new and desire to secure by Letters Patent of the United States is:

A fluid valve comprising:
(a) an elongated fluid supply conduit having a plurality of axially disposed outlet openings adjacent one end thereof;
(b) a closed housing secured to said one end of said conduit;
(c) a hollow tube slidably mounted in said conduit and having an opening therein disposed to be sequentially brought into registry with said outlet openings to direct fluid flowing through said conduit and said hollow tube through each of said outlet openings in sequence;
(d) a first resilient sealing means disposed between said housing and said conduit and engaging said hollow tube, and a second resilient sealing means disposed about a first or inlet end of said hollow tube and engaging said conduit so that all the fluid entering said conduit flows through said hollow tube;
(e) a second end of said hollow tube extending into said housing;
(f) a piston secured to said second end of said hollow tube and engaging said housing with a fluid tight fit to form a chamber;
(g) said piston having a small opening therein of substantially less surface area than the cross sectional area of said hollow tube;
(h) said small opening providing direct communication between said hollow tube and said chamber whereby a portion of the fluid flowing through said hollow tube enters said chamber to create a pressure within said chamber substantially equal to the pressure within said hollow tube;
(i) said piston having a first surface facing said chamber and a second surface facing said hollow tube;
(j) said first surface being larger than said second surface whereby the substantially equal pressures in said chamber and said hollow tube create unequal forces to move said piston toward said conduit to bring said opening in said conduit into registry with said outlet openings in sequence; and
(k) a spring disposed about said hollow tube between said first resilient sealing means and said piston with said spring being compressed by said piston during fluid flow and functioning to return said piston and said hollow tube to their original position upon termination of fluid flow.

References Cited
UNITED STATES PATENTS

| | | | |
|---|---|---|---|
| 2,059,126 | 10/1936 | Malthaner | 137—119 |
| 2,208,682 | 7/1940 | O'Brien | 137—119 |
| 2,532,568 | 12/1950 | Myers | 251—33 |
| 2,677,417 | 5/1954 | Logan et al. | 251—33 |
| 2,722,234 | 11/1955 | MacGeorge et al. | 251—33 |

ALAN COHAN, *Primary Examiner.*

D. J. ZOBKIW, *Assistant Examiner.*